Nov. 2, 1948.　　　　B. CARLIN　　　　2,452,902
SAFETY INNER TUBE FOR PNEUMATIC TIRES
Filed Dec. 7, 1945

Inventor
Bernard Carlin

By A. D. Adams
Attorney

Patented Nov. 2, 1948

2,452,902

UNITED STATES PATENT OFFICE 2,452,902

SAFETY INNER TUBE FOR PNEUMATIC TIRES

Bernard Carlin, Orange, Tex., assignor of forty-nine one hundredths to W. O. Haizlip and Richard B. Cammack, both of Nederland, Tex., and Joe Ener, Jr. and Lester De Cordova, both of Beaumont, Tex.

Substituted for application Serial No. 293,599, September 6, 1939. This application December 7, 1945, Serial No. 633,414

3 Claims. (Cl. 152—342)

This invention relates to safety inner tubes for pneumatic tires used on automotive vehicles, airplanes and the like and, among other objects, aims to provide an improved pneumatic inner tube having a plurality of compartments or chambers and valves so designed and arranged that, when one chamber is punctured or blows out, the other chamber or chambers will retain the air in them for sufficient time to permit a driver to stop safely and the valves between the deflated chamber and inflated chamber or chambers will be operated automatically by the deformed or flat wall of the punctured chamber as the tire rolls on the ground, not only to deflate the inflated chambers gradually, but also to give the driver a signal that the tire requires attention. Another object is to provide an inner tube having two or more chambers in which an inner chamber may be inflated to a higher pressure than the outer chamber. Still another aim is to provide a safety inner tube of this type which will positively prevent a tire casing from becoming disengaged from the rim after a puncture or blow-out occurs. The main idea is to provide for maximum safety of passengers using such inner tubes on high speed vehicles and to avoid disastrous wrecks caused by ordinary blow-outs and punctures.

Figure 1:
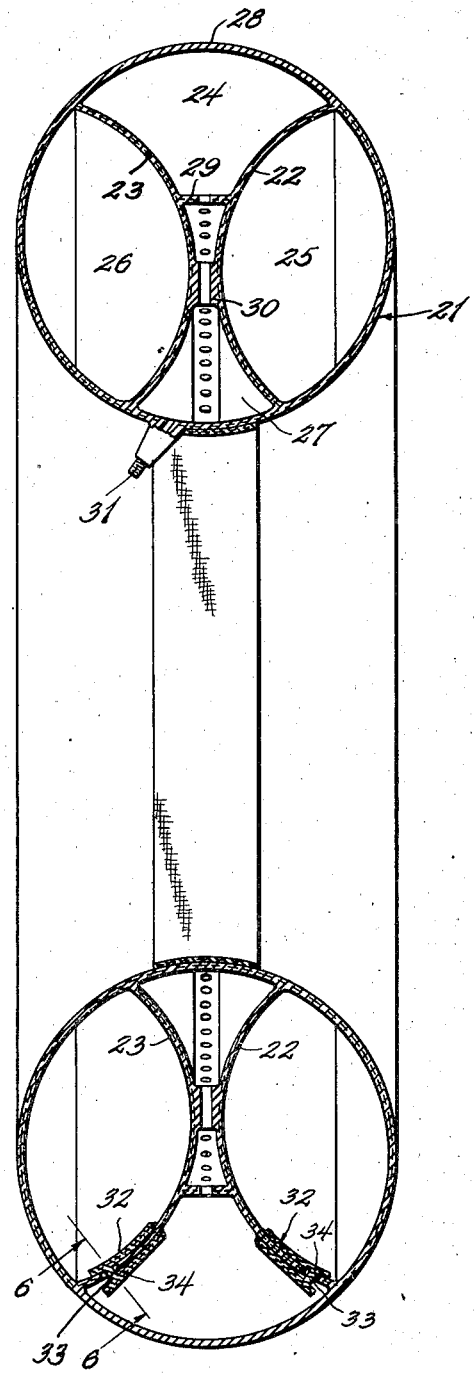
Figure 2:
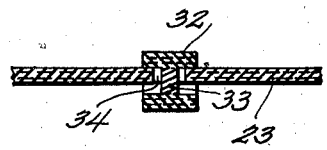

Other aims and advantages of the invention will appear in the specification, when considered in connection with the accompanying drawings, wherein:

Fig. 1 is a vertical sectional view of an inner tube embodying a form of the invention, and Fig. 2 is an enlarged fragmentary sectional view taken on the line 2—2 of Fig. 1.

This application is a substitute application to replace my prior application, Ser. No. 293,599, filed Sept. 6, 1939.

Referring particularly to the drawings, in Fig. 1, a main tube 21 is shown as being divided into separated compartments or chambers by flexible inelastic webs 22 and 23. In this example, the two webs 22 and 23 are arc-shaped and divide the tube into three compartments or chambers 24, 25 and 26, the two chambers 25 and 26 being generally elliptical and on opposite sides of the tube, and the webs 22 and 23 are spaced from each other on the inside, so that the chamber 24 extends vertically across the tube and has an inner portion 27 next to the rim through which the tube is inflated. In this form of the invention, the tube 21, where it forms the outer walls of the chambers 25, 26 and the portion 27 of chamber 24, is composed of rubberized cord fabric or reinforced rubber which is relatively inelastic and flexible; while the outside wall 28 of the chamber 24 is made of elastic rubber so that it can be vulcanized, and easily repaired. Also this elastic portion permits the inner tube to expand and contact the inside wall of the tire casing.

The two arcuate webs 22 and 23, which form the chambers 25 and 26, are shown as being reinforced and are connected by separate rubberized fabric web sections or ribs 29 and 30 having openings or perforations permitting the inner portion 27 of chamber 24 to communicate with the outside of this chamber.

In this form of the invention the inflating air is admitted to the portion 27 of chamber 24 through an ordinary valve stem 31 and passes into the chamber 24 as has just been explained. From the chamber 24, the air is permitted to pass into the chambers 25 and 26 through double flap valves 32, each composed of semi-flexible strips of rubberized fabric vulcanized at one end to the opposite faces of the webs 22 and 23. The free ends of the opposite flaps are shown as being connected by a stem or spacer 33 passing through a port 34. These double-acting valves are preferably arranged, as shown in Fig. 1, with the free ends of the lower flaps adjacent to the inside wall of the section 28 of the main tube. The arrangement of these valves is such that both flaps will be held out of contact with the ports through the webs, while the tube is being inflated. They are preferably slightly biased to close the ports inside the chambers 25 and 26 so that the air pressure in the chamber 24 opens them and passes into each of the compartments 25 and 26. Since the air flows slowly through the valve ports, during inflation of the tube, and the pressure in the chambers is nearly equalized the valves will not close the ports inside the chamber 24 and stop the flow of air. After the compartments are inflated to the desired pressure, say approximately thirty pounds, some of the air is released from the chambers 24 and 27 so that the two flap valves 32 will close because of the greater pressure in the chambers 25 and 26.

The arrangement of the two valves is such that when the tube is punctured through the section 28, the wall will flatten out on the ground or pavement and will engage the lower end portions of the flaps in the chamber 24, thus opening the flap valves upon each revolution of the wheel or tire and imparting an audible signal as well as a slight jar or shock to the vehicle. Thus, the driver or pilot may hear the air escaping upon each revolution of the wheel. Also the slight jar or shock upon each revolution of the wheel will be perceptible to the driver both through the steering wheel and the body of the vehicle. It will be noted that when the tube is punctured or blown out through the chamber 24, both of the side chambers 25 and 26 will remain inflated and will retain the casing in engagement with the tire rim. Also, these inflated compartments will keep the tire sufficiently inflated to enable it to be used for a mile or more so that a driver will have ample time to slow down the vehicle without danger of turning over. The connecting ribs between the webs will prevent chambers from being displaced. In the event that one of the side compartments or chambers 25 and 26 is deflated by a blow-out, the driver will be warned only by the noise. The side walls of the tire are not often punctured. When this happens, the flaps of the valves 32 will change their position to prevent air from escaping from the chamber 24 to and through the ruptured chamber. The inflated chamber 24 will support the tire and hold the casing on the rim even when both side chambers blow out.

If one of the side chambers has been blown out and it is desired to repair the tire, the chamber 24 may be deflated through the valve stem 31 and the air may then be exhausted from the other side chamber by pressing upon and deforming the casing to open the flap valve.

From the foregoing description, it will be seen that the improved safety tube is contrived to promote maximum safety of passengers and will positively prevent disastrous wrecks or accidents usually caused by ordinary punctures or blow-outs. Such tubes do not have to be punctured to permit removal of the tire casing and they are capable of being repaired by vulcanization. They can be made and sold at a reasonable price and it is contemplated that they will be widely adopted in the promotion of safety.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A safety pneumatic inner tube of the class described comprising a main tube; a pair of arcuate webs within the tube each extending from one side of the rim portion to a side of the tread portion and dividing the tube into three chambers, one in each side and one extending through the middle from the rim portion to the tread portion; reinforcing rubberized ribs connecting said webs together near the center of the tube; an inflating valve connected to the middle chamber; double acting check valves on opposite sides of the walls between the middle chamber and the side chambers connected to permit inflation of the side chambers through the middle chamber but preventing escape of air from the middle chamber through a side chamber after either side chamber blows out.

2. A safety pneumatic inner tube of the class described comprising a main tube; a pair of arcuate webs within the tube each extending from one side of the rim portion to a side of the tread portion and dividing the tube into three chambers, one in each side and one extending through the middle from the rim portion to the tread portion; reinforcing ribs connecting said webs near the center of the tube; said ribs, said webs and the side walls of the tube forming the side chambers being composed of rubberized cord fabric; an inflating valve connected to the middle chamber; double acting check valves on opposite sides of the walls between the middle chamber and the side chambers arranged to permit inflation of the side chambers through the middle chamber but preventing escape of air from the middle chamber through a side chamber after either side chamber blows out.

3. A safety pneumatic inner tube of the class described comprising a main tube; a pair of arcuate webs within the tube each extending from one side of the rim portion to a side of the tread portion and dividing the tube into three chambers, one in each side and one extending through the middle from the rim portion to the tread portion; an inflating valve connected to the middle chamber; double acting check valves between the middle chamber and the side chambers permitting inflation of the side chambers through the middle chamber but preventing escape of air from the middle chamber through a side chamber after either side chamber blows out, said double acting check valves being composed of a pair of flaps in the form of rubberized cord fabric vulcanized on opposite sides of each web near the tread with a spacer arm or finger extending through the valve opening, and the flaps on the lower side of each web adapted to be engaged by the deformed or flattened tread portion of the tube when the middle chamber is punctured or blown out and as the tire rotates on the ground or pavement to deflate the side chambers gradually by escaping puffs of air to give a signal to a driver or pilot.

BERNARD CARLIN.

REFERENCES CITED

The following references are of record in the file of this patent:

UNITED STATES PATENTS

| Number | Name | Date |
| --- | --- | --- |
| 627,972 | Brady | July 4, 1899 |
| 1,325,233 | Cooper | Dec. 16, 1916 |
| 1,462,942 | Rogers | July 24, 1923 |
| 1,952,221 | Ronneberg | Mar. 27, 1934 |
| 1,962,143 | Ford | June 12, 1934 |
| 2,169,041 | Gammeter | Aug. 8, 1939 |

FOREIGN PATENTS

| Number | Country | Date |
| --- | --- | --- |
| 29,267 | Netherlands | 1933 |
| 222,478 | Great Britain | 1924 |
| 578,007 | France | 1924 |
| 599,072 | France | 1926 |